June 18, 1946.  F. H. HAGNER  2,402,396
ELECTRICAL REGISTERING AND POSITION INDICATOR
Filed April 21, 1943  2 Sheets-Sheet 1
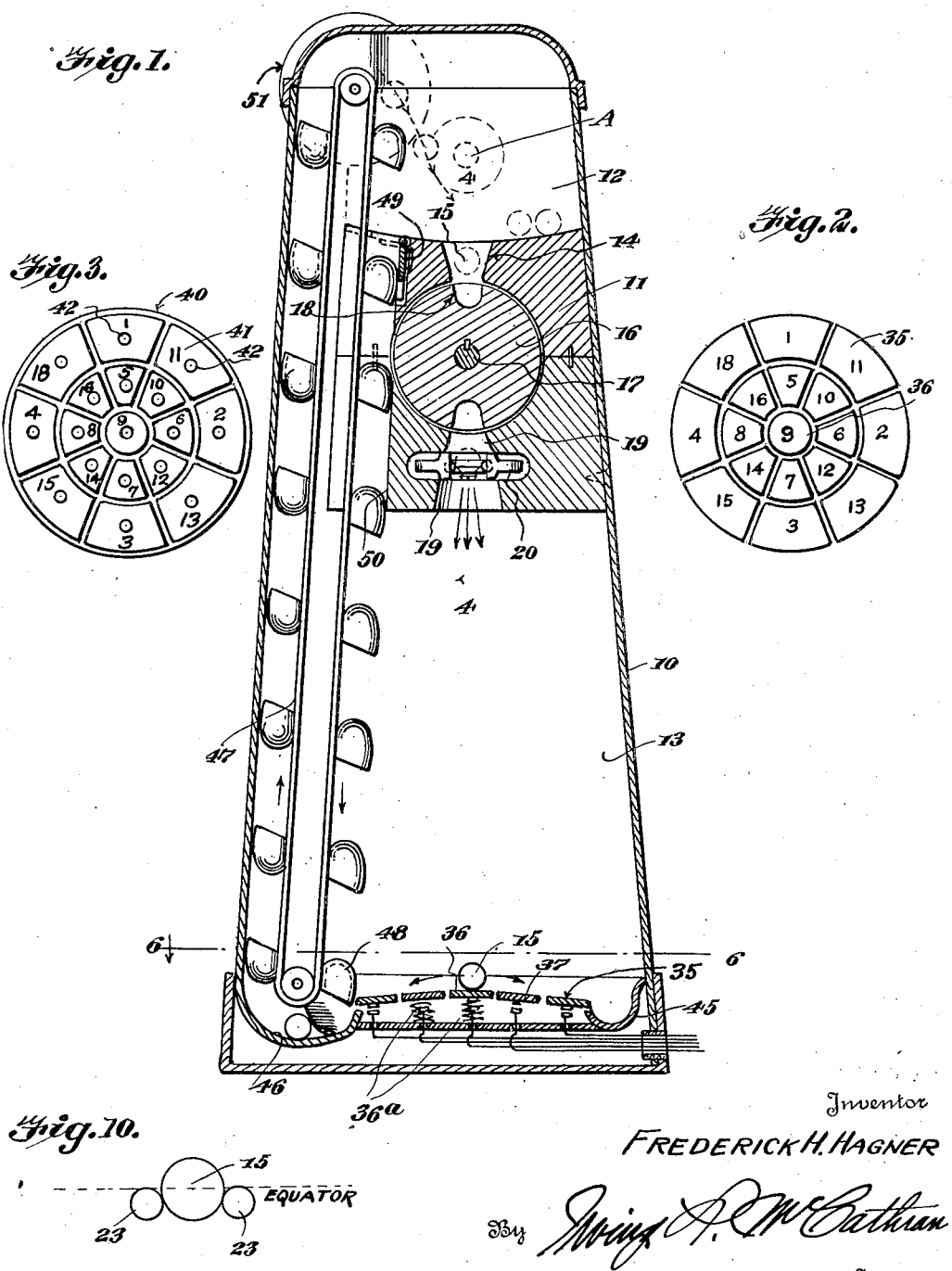

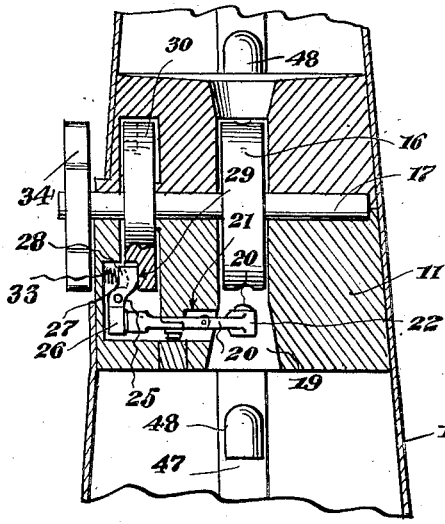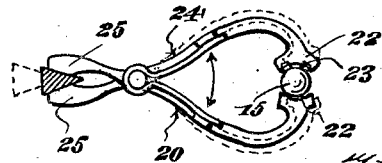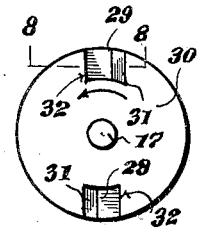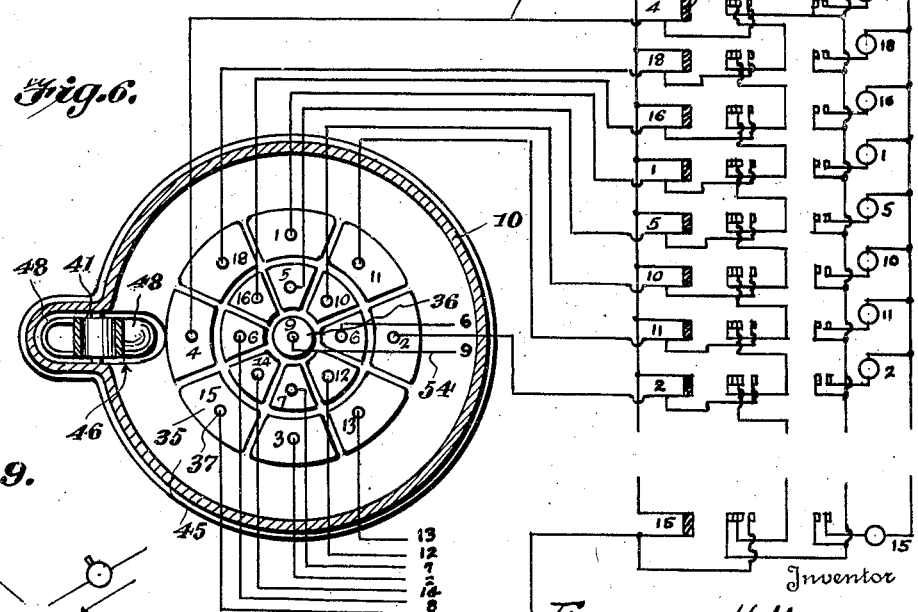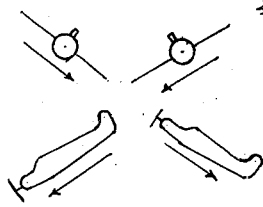
Frederick H. Hagner

Patented June 18, 1946

2,402,396

UNITED STATES PATENT OFFICE 2,402,396

ELECTRICAL REGISTERING AND POSITION INDICATOR

Frederick H. Hagner, San Antonio, Tex.

Application April 21, 1943, Serial No. 483,950

2 Claims. (Cl. 33—206)

This invention relates to an electrical registering and position indicator, and has for one of its objects the production of a simple and efficient means for electrically registering the angle, as well as the degree of tilt of an instrument, through the medium of a free-falling missile.

A further object of this invention is the production of a simple and efficient electrical indicating means which is actuated through the medium of a free-falling missile through force of gravity and is provided with electrical indicating means located upon the instrument panel of a vehicle such as an airplane and the like, which indicating means is actuated by the free-falling missile to indicate the angular position of the instrument and supporting means therefor, so that a pilot may be able to instantaneously determine the angle at which his airplane is flying and its degree of tilt, if any.

Other objects and advantages of the present invention will appear throughout the following specification and claims.

In the drawings:

Figure 1 is a vertical sectional view through the ball-dropping mechanism and electrical indicating means;

Figure 2 is a plan view of the electrical contacts upon which the missile is adapted to drop;

Figure 3 is a front elevational view of the indicating chart which is adapted to be carried by the instrument panel located at a distance from the ball-dropping mechanism;

Figure 4 is a fragmentary vertical sectional view taken on line 4—4 of Figure 1;

Figure 5 is a plan view of the ball-gripping tongs used in connection with the present invention;

Figure 6 is a transverse sectional view taken on line 6—6 of Figure 1, and also illustrating a typical electrical circuit for actuating the indicating lamps which are adapted to be carried by the instrument panel of an airplane;

Figure 7 is a side elevational view of the cam wheel which actuates the ball-releasing mechanism;

Figure 8 is an enlarged transverse sectional view taken on line 8—8 of Figure 7;

Figure 9 is a diagram illustrating several positions of an airplane carrying the registering and position indicator which may be indicated upon the indicating chart;

Figure 10 is a diagrammatic view illustrating the manner in which the missile is supported upon bearings located below the equator of the missile.

By referring to the drawings it will be seen that 10 designates the casing of the ball-dropping mechanism which preferably comprises an elongated tubular housing which is preferably hung in balanced relation from a point such as is indicated at A. The casing 10 carries a mechanism supporting housing 11 near the top thereof for dividing the casing 10 into an upper compartment 12 and a lower compartment 13. The upper compartment 12 constitutes a reservoir for receiving missiles in the nature of balls and the upper end of the housing 11 is provided with a central opening 14 for receiving the balls 15 from the upper compartment 12. A missile-dispensing wheel 16 is rotatably mounted below the socket 14 upon a supporting shaft 17 and this missile-dispensing wheel 16 is provided with a plurality of missile-receiving pockets 18 formed in the periphery thereof. The housing 11 is provided with a ball discharge opening 19 at its lower end as shown in Figures 1 and 2. The pockets 18 are adapted to receive the balls 15 from the compartment 12 when in an upper position, and these pockets are adapted to discharge the balls into the opening 19 when in a lower position.

Ball-supporting tongs 20 are supported in a horizontal position in the socket 21 formed in the lower end of the housing 11. These tongs 20 are provided with missile-supporting jaws 22 at their ends, which missile-supporting jaws 22 carry bearings 23 upon which the missiles 15 rest for suspending the missiles one at a time within the opening 19. The jaws of the tongs 20 are adapted to be normally urged apart by means of a spreading spring 24. The tongs 20 are provided with rearwardly extending wedge-engaging ends 25 between which ends 25 is adapted to fit a wedge portion 26 of a pivoted wedge latch 27 which wedge latch 27 extends at right angles to the longitudinal plane of the tongs 20. This pivoted latch 27 is spring-pressed and is provided at one end with a shoe 28 for dropping into the notches 29 formed in one face of the trigger-actuating wheel 30. Each notch 29 is provided with one inclined face 31 and one abrupt face 32 so that the latch 27 may suddenly drop into the notch 29 by force of the spring 33 and instantaneously pull the wedge portion 26 out of engagement with the ends 25, thereby permitting the spring 24 to immediately force the jaws 22 apart and release the missile 15 held therebetween. Since the wheel 30 is carried by the shaft 17 and is keyed thereto with the wheel 16, the notches 29 are arranged in transverse alignment relative to the pockets 18 and when one pocket 18 is being emptied of the ball, the opposite pocket 18 receives another ball from the reservoir 12. A suitable hand or finger wheel 34 is carried by the outer end of the shaft 17 to facilitate the rotation of the shaft 17.

It should be understood that the jaws 23 of the tongs 20 are adapted to be instantaneously released by means of the spring 24 to instantaneously drop the ball 15 and that the trigger latch 27 also instantaneously operates by dropping into the notches 29 of the wheel 30 thereby withdrawing the wedge portion 26 instantaneously from between the ends 25.

It should be understood that any suitable mechanism may be provided for actuating the tongs 20 to provide immediate movement to spread and contract the jaws of the tongs to first receive and support a ball or missile, and then to release the ball or missile under the control of an operator who actuates the wheel 34. Furthermore, any suitable or desired means may be employed rotating the shaft 17 without departing from the spirit of the invention.

An electrical contact or registering means is carried by the lower end of the casing 10 and this electrical contact or registering means preferably provides a plurality of contact segmental plates 35 which surrounds a central contact plate 36. This contact plate 36 may be preferably supported by suitable springs 36ª of a sensitive nature sufficient to cause a missile 15 dropped thereon to compress the plate and close the contact with the contacts 37 carried below the segments 35 and the central plate 36.

These contact segments 35 and the central plate 36 are electrically connected as described in the following, through a suitable electrical circuit to an indicating means 40 which is adapted to be carried on the instrument panel of an airplane. This indicating means 40 preferably comprises a plate having transparent segments 41 and an electrical bulb 42 is located behind each of the segments 41, the segments 41 being arranged in similar relation with respect to the segments 35, and the central plate 36 of the contact means previously described, so that when a ball drops upon one segment the corresponding segment in the indicating means will be illuminated, in this way permitting an aviator to determine his angular position, as well as his angle of pitch, if any, merely by noting the illumination of the segment upon the indicating means 40 as it is illuminated by a ball dropping through force of gravity from the ball-dropping means in the casing 10 upon the contact means at the bottom of the casing. It is not desired to limit myself to any particular type of electrical mechanism for providing a contact between the contact plates as shown in Figure 2, and the indicating means as shown in Figure 3, since this electrical mechanism may be varied, and may be of any typical or conventional type depending largely upon the character of current which may be available to accomplish the desired results.

As shown in Figure 1, the casing 10 carries a trough 45 at its lower end around the edge of the contact means, or the edges of the outer contact elements 35. These contact elements are preferably arched so as to cause the ball or balls 15 to roll toward the channel 45 which extends around the entire edge of the contact means. A receptacle 46 is located near one side of the trough 45 and an upwardly extending conveyor belt 47 of a suitable type is mounted to one side of the casing 10, this belt extending vertically of the casing 10 and carrying a plurality of ball-receiving cups 48. These ball-receiving cups 48 are adapted to pick up the balls from the receptacle 46 and elevate the same to the upper chamber 12 in the manner as will be obvious by considering Figure 1 and dumping the balls into this receptacle upon the upper end of the housing 11. A spring-pressed gate 49 which will allow the cups 48 to pass in a downward direction through the channel 50 normally closes the upper end of the channel and prevents the balls from rolling back through the channel 50.

Any suitable means may be provided for actuating the belt 47 such as an electrical motor, a clock mechanism, or any other suitable mechanism indicated by the numeral 51.

The electrical mechanism for illuminating the indicating means upon the panel of an airplane as contact is provided through a circuit closing or contact elements shown in Figure 2, is described in the following:

Each contact element 35 is electrically connected to a relay 52 by means of a wire 53 and the central contact plate 36 is similarly connected to an individual relay similar to the relay 52 by means of a wire 54. Each of the contact elements is connected to a separate relay through a conventional mechanism, which relay is adapted to actuate a lamp 42, a separate lamp being connected to each contact element and these lamps being carried under the transparent segments 41 of the indicating means 40. These lamps 42 are connected by means of a wire 55 to a battery or other source of supply 56, and a switch 57, the opposite side of the battery being connected to a common ground in the conventional manner. It should be understood that I do not desire to limit the present application to any particular type of electrical means in view of the fact that any suitable mechanism may be employed for illuminating the lamps on the instrument panel in the rear of the indicating means 40 as soon as the circuit is closed by means of the ball 15 dropping upon one of the segments 35 or 36. The particular type of electrical mechanism is immaterial so far as the actual invention is concerned.

By referring to Figure 9 it will be noted that through the medium of the indicating means a pilot, by observing the indicating means 40 may be able to determine the pitch or angle of his plane, and the lighting up of one of the segments 41 will indicate to the pilot whether or not his plane is in one of the positions such as is indicated in the diagram in Figure 9, that is to say, whether the plane is tipped to the right or to the left, or has its nose extending downwardly or upwardly.

It should be understood that the operator will release only one missile at a time by operating the finger wheel 34 while viewing the indicating chart or means 40, and he will then observe the number of the segment which is lighted by the first impact of the missile. The second missile is not released by the operator until the first missile comes to rest. This will avoid confusion and the lighting of other segments may be disregarded if they should become lighted by the bouncing of the missile over the remaining spring-supported segments of the electrical contact means. The supporting springs 36ª may be of sufficient strength to permit electrical contact with the contacts 37 only when the missile falls from the opening 19, and to resist compression of the segments 35 and closing the contacts when the missile bounces.

Having described the invention, what is claimed is:

1. A device of the class described comprising a pair of missile-supporting tongs pivotally mounted and arranged in a horizontal plane, said tongs having missile-supporting outer ends, bearings carried by the outer ends of the tongs for suspending a spherical missile and contact the missile in a supported position below its equator at all times, means for spreading the outer ends of the tongs apart for releasing the missile and for dropping the missile when released therefrom with no degree of deflection interference, a pivoted latch for engaging the tongs and moving the tongs to a missile-engaging position, a cam wheel engaging the latch for periodically moving the latch to and from an operative position, and means for feeding missiles to a point of engagement by the tongs when the tongs are moved to a missile-engaging position.

2. A device of the class described comprising a missile-dropping means, said means comprising a pair of horizontally extending pivoted missile-supporting tongs, said tongs having outer ends for suspending a single missile therebetween, means for moving said tongs to a missile-suspending position, and means for moving said tongs to a missile-releasing position, the last two mentioned means acting alternately one with respect to the other.

FREDERICK H. HAGNER.